United States Patent [19]

Mendenhall

[11] 4,256,506

[45] Mar. 17, 1981

[54] ASPHALT COMPOSITION FOR ASPHALT RECYCLE

[76] Inventor: Robert L. Mendenhall, 1770 Industrial Rd., Las Vegas, Nev. 89102

[*] Notice: The portion of the term of this patent subsequent to Dec. 28, 1993, has been disclaimed.

[21] Appl. No.: 734,292

[22] Filed: Oct. 20, 1976

Related U.S. Application Data

[63] Continuation-in-part of Ser. No. 488,518, Jul. 15, 1974, Pat. No. 4,000,000.

[51] Int. Cl.$^3$ .................... C08L 95/00; C08J 3/18
[52] U.S. Cl. .................... 106/280; 106/281 R; 404/72; 404/79
[58] Field of Search ............... 106/273, 278, 279, 280, 106/281; 404/17, 18, 32, 72, 73, 75, 76, 77, 78, 79

[56] References Cited

U.S. PATENT DOCUMENTS

| | | | |
|---|---|---|---|
| 938,698 | 11/1909 | Pine | 106/273 R |
| 981,225 | 1/1911 | Richardson | 106/279 |
| 1,189,772 | 7/1916 | Ammann | 34/134 |
| 1,639,276 | 8/1927 | Schutte | 404/79 |
| 2,034,860 | 3/1936 | Dalin | 34/137 |
| 2,421,345 | 5/1947 | McConnaughay | 259/158 |
| 2,639,651 | 5/1953 | Scott | 106/280 X |
| 2,701,213 | 2/1955 | Neville | 106/278 |
| 2,704,967 | 3/1955 | Rostler | 427/138 X |
| 2,715,517 | 8/1955 | Bojner | 34/142 |
| 2,870,080 | 1/1959 | Illman et al. | 106/276 |
| 2,879,219 | 3/1959 | Benedict et al. | 106/279 X |
| 2,884,229 | 4/1959 | Francis et al. | 34/108 |
| 3,072,559 | 1/1963 | Corbett | 106/273 X |
| 3,372,045 | 3/1968 | Baum et al. | 106/279 |
| 3,423,222 | 1/1969 | McConnaughay | 106/278 |
| 3,476,679 | 11/1969 | Fauber | 106/279 X |
| 3,567,475 | 3/1971 | Rostler | 106/278 |
| 3,832,201 | 8/1974 | Shearer | 106/281 |
| 3,845,941 | 11/1974 | Mendenhall | 259/157 |
| 3,986,887 | 10/1976 | Pitchford | 106/279 |
| 4,000,000 | 12/1976 | Mendenhall | 106/280 |

FOREIGN PATENT DOCUMENTS

345946 11/1934 Canada .
670727 11/1939 Fed. Rep. of Germany .
393454 6/1933 United Kingdom .
456922 11/1936 United Kingdom .

OTHER PUBLICATIONS

The Reclaimix Process, A Manual for Engineers and Contractors, 1954.

*Primary Examiner*—Theodore Morris
*Attorney, Agent, or Firm*—Seiler & Quirk

[57] ABSTRACT

A liquid asphalt composition comprises a mixture of asphalt and a hydrocarbon having over about 55% by weight aromatic content, which mixture is useful for being added to asphalt-aggregate recycle compositions during processing.

7 Claims, No Drawings

ASPHALT COMPOSITION FOR ASPHALT RECYCLE

This application is a continuation-in-part of my co-pending application Ser. No. 488,518 filed July 15, 1974 now U.S. Pat. No. 4,000,000.

BACKGROUND OF THE INVENTION

In U.S. Pat. No. 3,845,941 and 3,971,666 there are disclosed processes for recycling used asphalt-aggregate composition which include methods for determining make-up asphalt requirements of the used composition, and adding an appropriate amount of such asphalt to the used material as it is being processed. In my co-pending application Ser. No. 488,518 there is further disclosed a process in which an aromatic hydrocarbon is added during recycle processing of used asphaltic concrete. The aromatic hydrocarbon significantly enhances the properties of the recycle composition by achieving product having penetration and ductility characteristics like those of virgin compositions.

SUMMARY OF THE INVENTION

The present invention comprises a composition of a mixture of asphalt and aromatic hydrocarbon in a variety of proportions or ratios whereby a single additive composition may be added to the used materials during the recycle process. The advantages of utilizing such a mixture are that the additive composition can be made up prior to processing and conveniently added from a single supply source. Moreover, because the mixture is significantly less viscous than the asphalt itself, blending with the recycled composition is enhanced.

DETAILED DESCRIPTION OF THE INVENTION

The aromatic hydrocarbons utilized in the invention are those which are the highly aromatic, low viscosity, low volatility petroleum fractions such as thermally cracked residues, high boiling fractions of catalytically cracked gas oil, boiling fractions of cracking cycle stocks, residues from pyrolysis of residual petroleum fuel oils used in the production of gas and the like, and highly aromatic extracts of distillate oils used in making lube oils. Preferred members of the latter group include the high boiling extracts obtained by use of nonreactive highly polar, aromatically preferential solvents such as liquid sulfur dioxide, phenol, cresylic acid, beta-dichloroethyl ether, nitrobenzene, etc. The use of the so-called double solvent process employing mutually immiscible solvents like cresylic acid and propane also yields suitable extracts. The useful hydrocarbon fractions may contain paraffinic unsaturated and naphthenic compounds, but are predominantly aromatic, that is, they contain above about 55% and preferably above 65% aromatics by weight. Viscosities of these materials may range from about 35–150 SSU at 210° F. to 75 or more than 13,000 SSU at 100° F. In general, the most preferred petroleum hydrocarbon fractions have a viscosity-gravity constant (VGC) above 0.905 and initial boiling points above about 300° F. and preferably above 500° F. Mixtures of these hydrocarbons may also be used. More preferable, initial boiling points of the hydrocarbon compositions are above 500° F. with flash points (c.o.c.) above about 300° F.

The asphalts used in preparing the compositions of the invention are not particularly critical so long as they do not detract from the enhancement of the final asphalt-aggregate composition penetration and ductility properties. Normally, although any asphalt of AR (Aged Residue) grades 1,000–16,000 may be used, preferably the upper limit of the viscosity is about 10,000 poise at 60° C. More preferable, the asphalts are AR grades AR-1000 and AR-2000 having viscosities at 60° C. between about 750 and 2,500 poise. These less viscous asphalts will require less petroleum hydrocarbon in the mixture to achieve a lower viscosity composition.

Different blends of asphalt and aromatic hydrocarbon were prepared using an AR-2000 asphalt having a viscosity of 150,000 mpa-sec (millipascal second = centipoise) and blending it with an aromatic petroleum hydrocarbon having the following properties:

| | |
|---|---|
| Viscosity, SSU/100° F. | 13,430 |
| SSU/210° F. | 99.3 |
| Gravity, °API | 5.6 |
| Specific Gravity/60° F. | 1.0320 |
| Flash Point, c.o.c., ° F. | 425 |
| Distillation, ° F. | |
| IBP | 740 |
| 5% | 765 |
| 10% | 772 |
| 50% | 818 |
| 90% | 884 |
| Viscosity-Gravity Constant (VGC) | 0.996 |
| Molecular Analysis, Clay-Gel % W | |
| Asphaltenes | 0 |
| Polar Compounds | 18.0 |
| Aromatics | 76.0 |
| Saturates | 6.0 |

A blend of 25% asphalt and 75% hydrocarbon had a viscosity range of between 500 and 1,000 mpa-sec, a 50/50 blend had a viscosity range of between 2,000–4,000 mpa-sec, a 72% asphalt-28% hydrocarbon had a viscosity range of between 8,000 and 16,000 mpa-sec, and an 88% asphalt to 12% hydrocarbon had a viscosity range of between 30,000 and 60,000 mpa-sec. The above percentages are given by weight and stated viscosities were determined at 140° F. The blends were used in recycling used asphalt-aggregate composition by adding them directly to the compositions being mixed and heated to achieve preferred products having penetrations of between about 25 dmm and about 300 dmm at 77° F. The preferred products also exhibit a ductility of at least 150 cm at 77° F., which properties are substantially like those of virgin asphalt-aggregate composition materials. Although the hydrocarbon-asphalt blend may be added to the used asphalt-aggregate compositions at any time during the processing, it is preferably added after the used material has been heated to at least about 200° F. at which time it is in a semi-fluid state and can be more easily mixed with the liquid blend. Conveniently, addition of the blend to the heated asphalt-aggregate composition may be made during the initial heating and mixing phase as disclosed in the aforesaid patents, or it may be later mixed with the composition in a pugmill, again preferably with the temperature being maintained at least above about 200° F.

The specific ratio of aromatic hydrocarbon and asphalt used in preparing the mixture will depend on the type of used asphalt containing composition being treated in the recycling process. Normally, the harder and more brittle the used asphalt is, the greater should be the relative concentration of aromatic hydrocarbon required in order to achieve the above stated penetration and ductility characteristics. However, for most recycle compositions, asphalt: hydrocarbon blend ratios between about 1:10 and about 5:1 by weight, respectively are suitable, with those of between 10% and about 80%, by weight, hydrocarbon being preferred. These as well as other variations of preparing and using the blends within the purview of the invention will be evident to those skilled in the art.

I claim:

1. In a process for treating used asphalt-aggregate composition comprising heating and mixing said composition, the improvement comprising adding to said composition a composition consisting essentially of a petroleum hydrocarbon having over 55% aromatics, and asphalt and mixing the resulting composition at a temperature of at least about 200° F.

2. The process of claim 1 wherein said petroleum hydrocarbon has a flash point above about 300° F.

3. The process of claim 2 wherein said petroleum hydrocarbon has an initial boiling point above about 500° F.

4. The process of claim 1 wherein said asphalt has a viscosity of between about 500 and about 10,000 poise at 60° C.

5. A process for treating used asphalt-aggregate composition comprising heating and mixing said composition to above about 200° F., adding a composition consisting essentially of a petroleum hydrocarbon having over 55% aromatics and asphalt to said asphalt-aggregate composition, and mixing the resulting composition at a temperature of at least about 200° F.

6. The process of claims 1 or 5 wherein the amount of said petroleum hydrocarbon and asphalt composition added is sufficient to achieve a asphalt-aggregate composition product having a penetration of between about 25 dmm and about 300 dmm at 77° F.

7. The process of claims 1 or 5 wherein the amount of said petroleum hydrocarbon and asphalt composition added is sufficient to achieve a asphalt-aggregate composition product having a penetration of between about 25 dmm and about 300 dmm at 77° F., and a ductility of at least 150 cm at 77° F.

* * * * *